(12) United States Patent
Wu et al.

(10) Patent No.: US 7,797,997 B2
(45) Date of Patent: Sep. 21, 2010

(54) CONFIGURATION AND METHODS FOR MANUFACTURING TIME-OF-FLIGHT MEMS MASS FLOW SENSOR

(75) Inventors: Xiaozhong Wu, San Jose, CA (US); Liji Huang, San Jose, CA (US)

(73) Assignee: Siargo Inc., Santa Clara, CA (US)

( * ) Notice: Subject to any disclaimer, the term of this patent is extended or adjusted under 35 U.S.C. 154(b) by 118 days.

(21) Appl. No.: 12/229,605

(22) Filed: Aug. 24, 2008

(65) Prior Publication Data

US 2009/0049907 A1    Feb. 26, 2009

Related U.S. Application Data

(60) Provisional application No. 60/965,896, filed on Aug. 24, 2007.

(51) Int. Cl.
*G01F 1/68* (2006.01)
(52) U.S. Cl. .................................................. 73/204.26
(58) Field of Classification Search ............. 73/204.26, 73/204.23, 202.5, 861.95, 204.22, 204.19; 702/50
See application file for complete search history.

(56) References Cited

U.S. PATENT DOCUMENTS

| | | | | |
|---|---|---|---|---|
| 4,854,167 A | * | 8/1989 | Czarnocki et al. | ........ 73/204.19 |
| 4,956,793 A | * | 9/1990 | Bonne et al. | ................... 702/50 |
| 5,583,297 A | * | 12/1996 | Stocker et al. | ................ 73/755 |
| 6,354,150 B1 | * | 3/2002 | Rudent et al. | .............. 73/202.5 |
| 6,681,625 B1 | * | 1/2004 | Berkcan et al. | .......... 73/204.23 |
| 7,261,004 B2 | * | 8/2007 | Breen et al. | .............. 73/861.95 |
| 7,383,726 B2 | * | 6/2008 | Ike et al. | .................. 73/204.22 |
| 2001/0032503 A1 | | 10/2001 | Schrittenlacher | |
| 2005/0034534 A1 | | 2/2005 | Harnett et al. | |
| 2007/0017285 A1 | | 1/2007 | Wang et al. | |

* cited by examiner

*Primary Examiner*—Jewel Thompson
(74) *Attorney, Agent, or Firm*—Bo-In Lin

(57) ABSTRACT

This invention discloses a mass flow sensor manufactured by applying the micro-electromechanical system (MEMS) process to provide a new and improved mass flow sensor that is a self-calibrated in a time-of-flight manner with configuration to measure the flow velocity directly. The self-calibration of a mass flow rate sensor is achieved by providing an electric pulse to a heater in the flow and determining a temperature variations of the fluid. The method further includes a step of measuring a temperature variation by a temperature sensor disposed at a short distance from the heater. The method further includes a step of correlating the temperature variation measured at the temperature sensor with the temperature variation of the heater to determine a time delay and a corresponding flow velocity.

18 Claims, 3 Drawing Sheets

■ Metal connection line

CONFIGURATION AND METHODS FOR MANUFACTURING TIME-OF-FLIGHT MEMS MASS FLOW SENSOR

This Patent Application is a Non-Provisional Application and claims the Priority Date of a Provisional Application 60/965,896 filed on Aug. 24, 2007 by the same Applicants of the present Patent Application.

BACKGROUND OF THE INVENTION

1. Field of the Invention

The present invention is generally related to general-purpose flow sensors and flow meters. More particularly, this invention relates to the design and manufacturing processes for high-performance composition independent flow sensors manufactured by applying the technologies of micro-electromechanical systems (MEMS) and the methods of making and operating such high-performance flow sensors.

2. Description of the Related Art

Conventional fluid metrology technologies for designing and manufacturing devices such as gas or fluid mass flow sensors and gas or fluid mass flow meters are still limited by technical difficulties of inaccurate measurements of the mass flow rates due to the variations of conditions of the flow of the gas or fluid such as variation of gas or fluid flow compositions affect the flow rate measurements. Specifically, these technical difficulties arise from the fact that the measurements are based on thermal principles to measure and generate the mass flow data by performing a calibration based on a specific gas or fluid flow with fixed composition. Variation of the gas or fluid flow composition will thus introduce substantial measurement errors to the system. For example, the system operated with natural gas flow transmission process often incurs compositional variations, as the natural gas provided by a natural gas supplier cannot continuously maintain that the natural gas as supplied has a constant composition. A natural gas flow may have different mixtures of pure natural gas with oxygen or carbon dioxide. The percentage of pure natural gas may be continuously changing. For this reason, there is no guarantee that the natural gas received from a natural gas supplier has a fixed and unchanging composition and the variations of the composition must be monitored in order to accurately determine the mass flow rate.

Therefore, the mass flow rate generated from the conventional thermal principle is deviated from the true flow rate due to the fact that the calibrations of the flow rate sensors are based on a constant composition of the gas or fluid flow. The compositional variations of the gas or fluid flow have not been properly taken into consideration.

In order to overcome such difficulties, conventional volumetric technologies are usually implemented with additional temperature and pressure compensation to achieve more accurate mass flow rate measurements. However, measurements obtained with the conventional volumetric meters such as turbine meter suffer from a narrow measurement range that could not meet many practical requirements. The commercially available compositional independent devices, such as the Coriolis flow meters, provide direct mass flow but these types of flow meters cannot otherwise provide accurate volumetric flow that is a conventionally acceptable metrology unit when the fluid has compositional variations. In addition, it can only be applied for measurements of flow rate of dense media such as liquid flow or highly compressed gases.

Thermal mass flow meters provide direct mass measurement of flows by measuring the changes in the temperature field that are functional related to the mass of the moving fluid. But the measurements are fluid specific, and the thermal laminar boundary layer cannot be maintained for sizes of most applications other than the capillary formality. Consequently, individual calibration for each specific application has to be performed to obtain accurate flow rate measurement. The cost of applying such types of flow sensors is significantly increased due to lengthy and detailed calibration process that cause a significant increase in the manufacturing and operational costs that demand fluid specific calibrations.

Most of the fluid meters, particularly the meters applied to monitor and control the industrial processes are required to operate continuously without interruption. Hence, in situ or online calibrations are required to maintain and assure the measurement accuracy. However, the online real-time calibrations would significantly impact the productivity and thus increase the operational costs. Although the ultrasonic flow meters have the advantage of allowing online calibration, for most applications, the difficulties and limitation due to the complex algorithms involved and the higher cost of such measurement meters prevent such solutions the ultrasonic flow meters as a practical useful solutions to above-mentioned difficulties and limitations.

For these reasons, there are still needs exist for those of ordinary skill in the flow meter design and manufacture to provide new and improved device configurations manufactured and operated with new and improved methods to overcome the above discussed difficulties and limitations. Specifically, for those of ordinary skill in the art there is still a need to provide a mass flow sensor to effectively and conveniently calibrate the measurements of flow rate with sufficient accuracy by taking into consideration of the temperature, pressure changes and particularly the composition independence of the operational conditions in carrying out the flow rate measurements.

SUMMARY OF THE INVENTION

Accordingly, it is an aspect of the present invention to provide a mass flow sensor manufactured by applying the micro-electromechanical system (MEMS) process to provide a new and improved mass flow sensor that is an accurately calibrated in a time-of-flight manner with configuration to measure the flow velocity directly such that the above discussed limitations and difficulties can be resolved.

Another aspect of this invention is to provide a new and improved sensor configuration and method to carry out an accurate calibration of a mass flow rate sensor by providing an electric pulse to a heater in the flow and determining a temperature variations of the fluid. The method further includes a step of measuring a temperature variation by a temperature sensor disposed at a short distance from the heater. The method further includes a step of correlating the temperature variation measured at the temperature sensor with the temperature variation of the heater to determine a time delay and a corresponding flow velocity.

Another aspect of this invention is to provide a new and improved sensor configuration and method to carry out an accurate calibration of a mass flow rate sensor by providing a sequence of modulated electric pulses with a specific frequency to a heater in the flow and determining a temperature of the heater. The method further includes a step of measuring a temperature variation by a temperature sensor disposed at a short distance from the heater. The method further includes a step of correlating the temperature variation measured at the temperature sensor with the temperature variation of the heater to determine a time delay and a corresponding flow velocity.

Another aspect of this invention is to provide a new and improved sensor configuration and method to carry out an accurate calibration of a mass flow rate sensor by providing the sequence of modulated pulses as sine-shaped pulses. The temperature measured at the sensor by applying a lock-in amplifier technique. The ratio of the out-of-the phase and in-the-phase components is measured to obtain the phase lag. A flow velocity is determined from the phase lag.

Another aspect of this invention is to provide a new and improved sensor configuration and method to carry out an accurate calibration of a mass flow rate sensor by measuring directly the temperatures of the heater and the temperature sensors. A pressure of the flow is also measured. The measurements are applied for monitoring the variation of a specific heat of the flow and also monitoring the density and also the composition of a gaseous flow.

Briefly, in an exemplary embodiment, this invention discloses a flow rate sensor disposed in a flow that includes a temperature sensor disposed adjacent to a micro-heater. The flow rate sensor further includes a heater controller to provide a heating energy to the micro-heaters for measuring a heat convection and time delay of energy transfer from the micro-heater to the temperature sensor through the heat convection in the flow. In another exemplary embodiment, the flow rate sensor further includes a processor for receiving an input of the flow velocity to directly determine a flow velocity of the flow. In another exemplary embodiment, the heater controller provides the heating energy, as an electric pulse to the micro heater. In another exemplary embodiment, the heater controller provides the heating energy as modulated electric energy to the micro heater. In another exemplary embodiment, the heater controller provides the heating energy as modulated sinusoid-waveform electric energy to the micro heater. In another exemplary embodiment, the heater controller provides the heating energy as modulated square-waveform electric energy to the micro heater. In another exemplary embodiment, the heater controller provides the heating energy as modulated electric energy with a specific frequency to the micro heater. In another exemplary embodiment, the flow rate sensor further includes a second temperature sensor disposed adjacent to a second micro-heater and the heater controller further provides heating energy to the second micro heater. In another exemplary embodiment, the temperature sensor and heater and the second temperature sensor and heater are configured for measuring a upstream to downstream temperature difference substantially independent of a heat conduction in the flow. In another exemplary embodiment, the flow rate sensor further includes a first independent temperature sensor to measure a temperature of the flow. In another exemplary embodiment, the flow rate sensor further includes a second independent temperature sensor for integrating into a control loop of the heater controller. In another exemplary embodiment, the flow is conducting in a flow channel having a diameter less than 50 mm. In another exemplary embodiment, the flow is conducting in a flow channel having a diameter $\geq 50$ mm. In another exemplary embodiment, the temperature sensor and the micro heater are supported on a semiconductor substrate. In another exemplary embodiment, the micro heater includes metal strip composed of gold or platinum but preferably platinum. In another exemplary embodiment, a distance between the temperature sensor and the micro heater is approximately 2 to 12 micrometers and preferably 5 micrometers. In another exemplary embodiment, a distance between the micro heater and the second micro heater is approximately 50 to 5000 micrometers but preferably 100 to 500 micrometers. In another exemplary embodiment, the temperature sensor includes a metal strip composed of gold or platinum but preferably gold.

In a preferred embodiment, this invention discloses a method for measuring a flow rate of a flow. The method includes a step of disposing a temperature sensor at a short distance from a micro heater in the flow and providing a heating energy to the heater for measuring a time lag by correlating temperature variations of the temperature sensor and the heater for determining a flow velocity of the flow. In an exemplary embodiment, the step of providing a heating energy to the heater further includes a step of providing a pulsed heating energy to the heater. In another. In an exemplary embodiment, the step of providing a heating energy to the heater further comprising a step of providing a modulated sinusoid heating energy to the heater and determining a temperature response from a heater temperature variation by applying a lock-in phase amplification technique followed by measuring a ratio of an out-of-the-phase component to an in-phase component for determining a phase lag and determining a flow velocity from the phase lag. In an exemplary embodiment, the method further includes a step of continuously determining the flow velocity for continuously monitoring a specific heat of the flow. In an exemplary embodiment, the method further includes a step of continuously measuring a pressure and applying the specific heat of the flow to continuously monitoring a density and composition of the flow.

These and other objects, features and advantages of the present invention will no doubt become apparent to those skilled in the art after reading the following detailed description of the preferred embodiments that are illustrated in the several accompanying drawings.

BRIEF DESCRIPTIONS OF THE DRAWINGS

The present invention can be better understood with reference to the following drawings. The components within the drawings are not necessarily to scale relative to each other, emphasis instead being placed upon clearly illustrating the principles of the present invention.

DETAILED DESCRIPTION OF THE PREFERRED EMBODIMENTS

Figure 1:
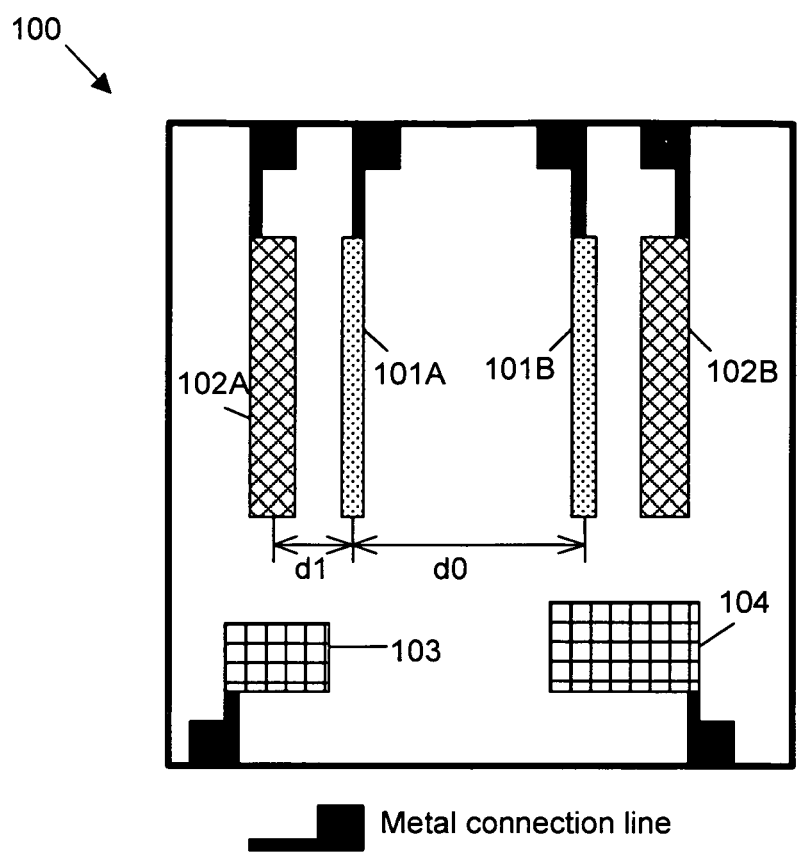
FIGS. 1 and 2 are respectively the side cross sectional view and top view of the MEMS flow sensing system.
Figure 2:
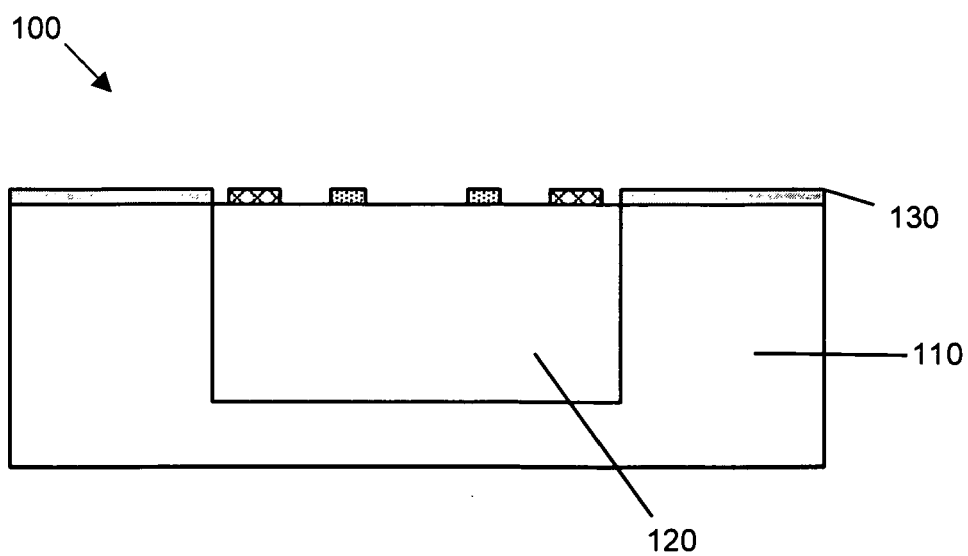

FIG. 1 shows a top view and FIG. 2 shows a side cross sectional view of a flow rate sensor 100 manufactured by a MEMS technology as a preferred embodiment of the present sensor. The flow rate sensor 100 is supported on a conductive silicon substrate 110 with a mask layer 120. The mask layer is composed of either insulation material such as silicon nitride or silicon oxynitride and having a thickness ranging from 0.2 to 1 µm and preferably 0.8 µm. The mask layer provides a selective opening to the top surface of the bulk silicon. The opening allows the formation of a layer 130 composed of bulk porous silicon or oxidized porous silicon. The porous silicon or oxide porous silicon layer 130 has a thickness ranging from 5 to 200 μm, but preferably 100 μm. The porous silicon or oxide porous silicon layer 130 is formed through an anode process to form the layer 130 composed of the porous or oxidized porous silicon. The porous or oxidized porous silicon layer 130 provides the thermal isolation to each of the sensors and heaters.

The flow rate sensor 100 includes a pair of heaters 101A and 101B to serve as micro heaters functioning as the anemometer for measuring the heat convection of the fluid. The flow rate sensor 100 further includes a pair of temperature sensors 102A and 102B to measure the temperature variations as the heat generated by the heaters 101A and 101B is carried away by the flow of the fluid. The heat generated by the heaters is carried away by the fluid through thermal conduction and further through heat convection. Therefore, for a fixed amount of electrical power supplied to the heaters to generate heat, the temperatures of the heaters are function of the thermal conductivity $\chi$ and $C^*V$ where C is the heat capacity of the fluid and V is the flow velocity. In a range of a higher flow rate, temperature variation is mainly determined by the heat convention $C^*V$ as a dominating factor compared to heat conduction in determining the heat carried away from the heaters. The temperature variations are mainly related to the heat convection $C^*V$. As the fluid flows from the upstream heater and sensor to the downstream heater and sensor, the heat carried away by the fluid by heat conduction symmetrical relative to the upstream and downstream sensors. However, the heat carried away by heat convection is directional. For these reasons, the temperature difference measured between the upstream and downstream sensors are mainly related to the heat convection $C^*V$.

The MEMS self-calibrated flow sensor 100 further includes an independent temperature sensor 103 as shown in FIG. 1 to measure the fluid temperature. The MEMS self-calibrated flow sensor further includes a temperature sensor 104 shown in FIG. 1 integrated into the close control loop together with the micro heaters to provide constant power to the heater or maintain a constant temperature to the heater. The MEMS self-calibrated flow sensor is able to achieve the self-calibration via a modulation of the micro heater power and the modulated signal received by a downstream sensor. The modulation signal may be a sinusoid wave, a square wave, a pulse or any other modulation with a fixed frequency. The self-calibration is achieved by measuring the time of the modulated signal traveled between the micro heater and the downstream sensor located at a fixed distance away from the heater and the traveling time is applied in the time-of-flight scheme for determining the flow velocity. The method provides measurement and system configuration flexibilities and is applicable in measurement of the fluid mass flow rate in a flow channel of any size. For a channel size <50 mm, a single sensor may apply; for channel size ≧50 mm multiple sensors may apply to obtain average at different channel locations so that to ensure accuracy.

Unlike the conventional techniques that measure either the temperature of the heater or the temperatures of the sensors, the methods disclosed in this invention measure the velocity V directly. A key improvement of this invention is by modulating the temperature of the heater. The temperature sensors measure the modulated temperature variations with a time delay $\Delta t$. The temperature variations can therefore serve as a tracer signal to determine the flow velocity directly. With a measurement of the time delay $\Delta t$ and applying the geometrical data of the structural separation d between the heaters and the sensors, the velocity of the flow can be directly measured as:

$$V=d/\Delta t$$

Figure 3A:
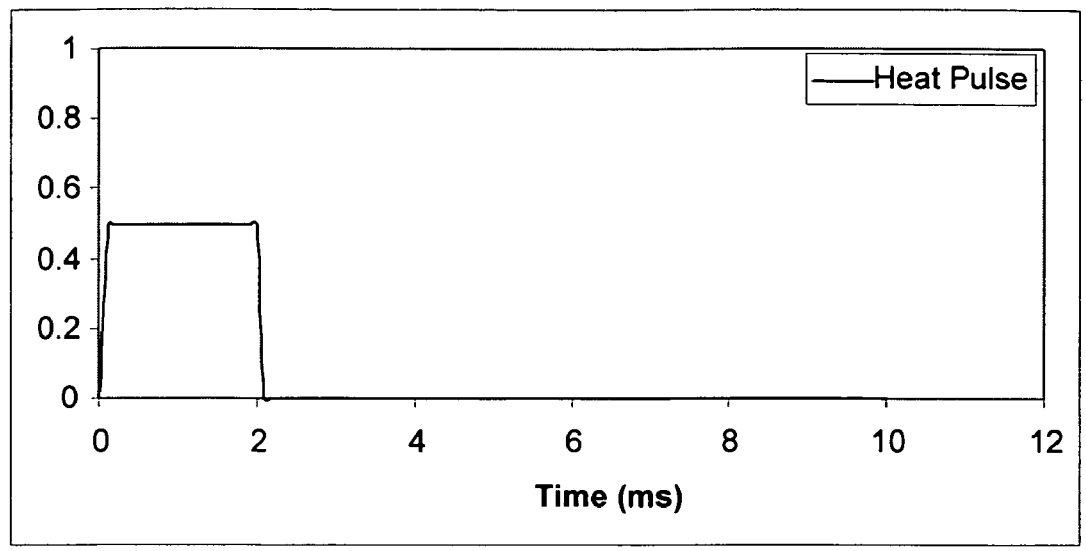
FIG. 3A is a timing diagram for illustrating an electrical pulse applied to a heater.
Figure 3B:
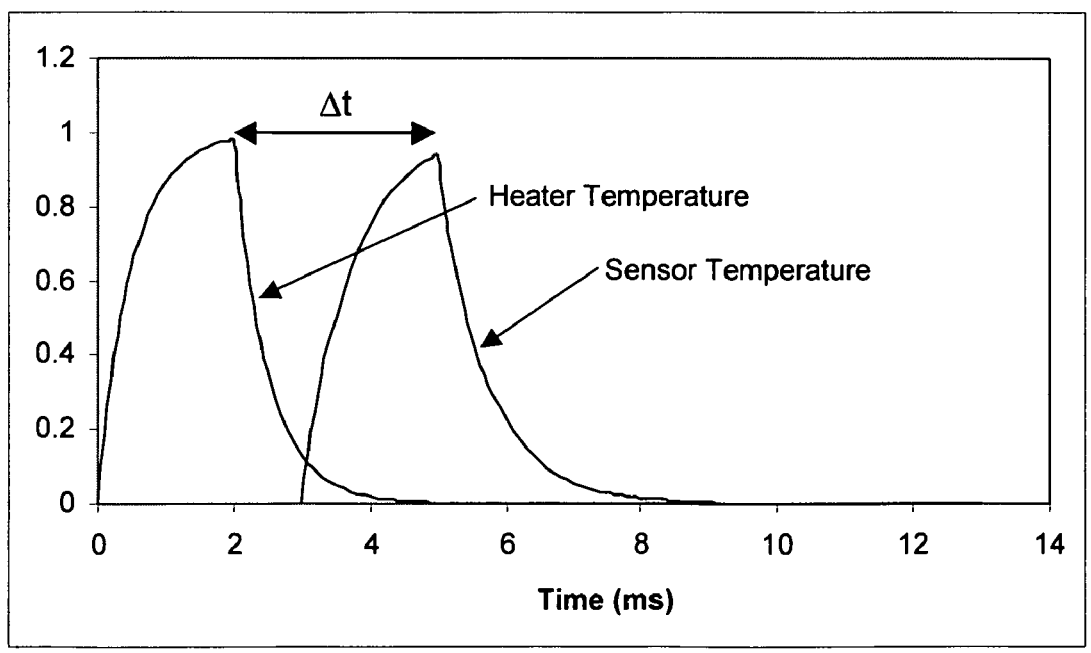
FIG. 3B is a timing diagram for illustrating the temperature variation of the heater receiving the electrical pulse of FIG. 3A and the corresponding temperature variation sensed by a flow rate sensor.

FIG. 3A is a timing diagram for illustrating an electric pulse applied to the heater. Since the heater with the surrounding gas or fluid has a specific heat capacity, the temperature of the heater ramps up and down. As the heat generated by the heater is carried away by the gaseous or liquid flow to the temperature sensor, the temperature sensor detects similar temperature fluctuations corresponding to the temperature fluctuations of the heater with a time delay $\Delta t$ as shown in FIG. 3B. The peak temperature detected by the temperature sensor is lower than the peak temperature of the heater because a portion of the heat generated by the heater is carried away through the heat conduction process in the flowing media under flow rate measurement. A portion of the heat generated by the heater when powered the electric pulse therefore does not flow to the temperature sensor. Furthermore, the temperature variations measured by the temperature sensor has a broader profile than the temperature variations of the heater. By carefully controlling the electric pulse supplied to the heater and by placing a temperature sensor adjacent to the heater, a direct correlation can be established between the temperature variations of the heater and the temperature variations measured by the temperature sensor. A more direct correlation exists when the heat dissipation from the heater is more significantly through the heat convection process than the heat conduction process, i.e., $CVT/d > \Delta T/d^2$. For a gaseous flow, this condition is more readily satisfied when the velocity is not too low, or the pressure is not too low. For example, for the heater-sensor separation being 100 μm, velocity 1 m/s, the thermal convection will be more than 10 times of the thermal conduction for 1 atm gas at room temperature. For liquid flow, the condition $CVT/d > \chi T/d^2$ is satisfied for much lower velocity.

The electric pulse supplied to heat the heater can either be discrete single pulse, or multiple pulses. The delay for each pulse can be used to calculate either the average flow velocity, or the variation of the velocity.

Figure 4A:
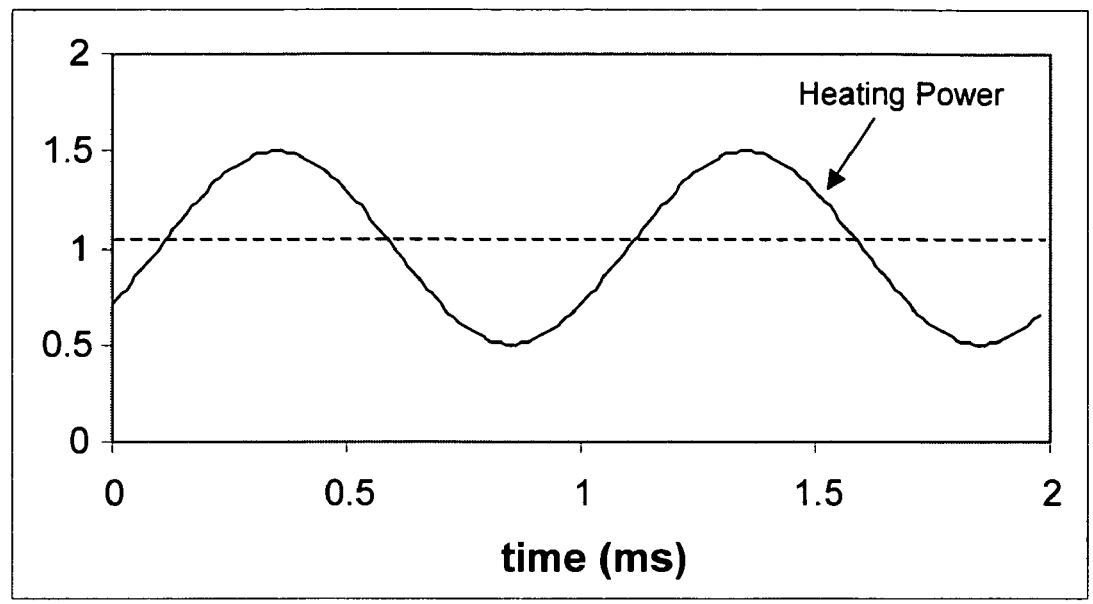
FIG. 4A is a timing diagram for illustrating a modulate electric power applied to a heater.
Figure 4B:
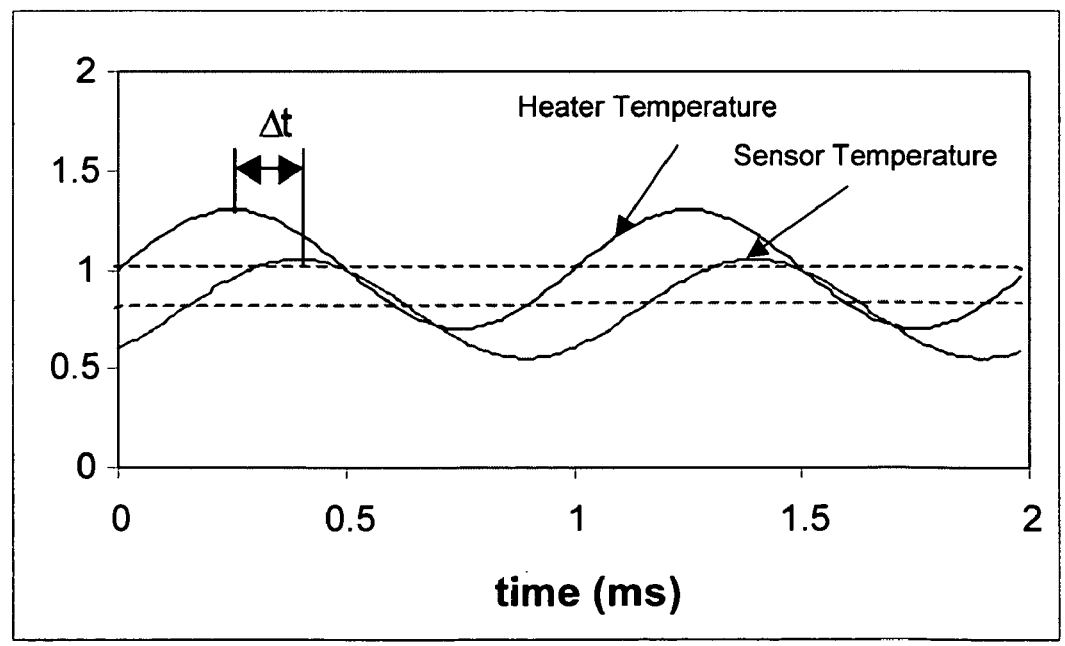
FIG. 4B is a timing diagram for illustrating the temperature variation of the heater receiving the modulated electrical power of FIG. 4A and the corresponding temperature variation sensed by a flow rate sensor.

FIG. 4A is a timing diagram for illustrating an alternate method by supplying electrical power with a waveform as a sine modulation to the heater. FIG. 4B shows the corresponding temperature variations of the heater and the temperature sensor also has a correlated sine waveform. The temperature of the heater has a correlated modulated fluctuation of the same frequency $\omega$ as the heating power that is twice that of the electric current, with a phase shift from the power modulation due to the thermal capacity of the heaters. It is necessary to measure directly the temperature of the heater as the reference. The modulating temperature of the heater is transmitted when carried by the flow. A correlated temperature variation is detected by the sensors, with a phase shift $\Delta\phi=\omega\Delta t$. The velocity is thus obtained as $V=d/\Delta t=\omega d/\Delta\phi$. The control of phase of the modulated power supplied to the heater can be readily achieved by utilizing the standard lock-in amplifier technique. The temperature of the heater is used as the reference and the amplitude of the temperature variations of in-the-phase and out-of-the-phase components of the temperature modulation $\Delta T_{senser}=T_0 \sin(\omega t+\omega\Delta t))$ are measured as $T_0 \cos \omega\Delta t$ and $T_0 \sin \omega\Delta t$, respectively. The ratio of the out-of-phase component to the in-the-phase component is: $\tan(\omega\Delta t)$. For example: when the temperature of the heater is modulated with a frequency 1 KHz, e.g., for a heater of the size 3 μm, it can be easily modulated by power supply having a 1 KHz frequency. By arranging a heater-sensor separation of 0.1 mm, then for flow velocity V=1 m/s, the ratio between the out-of-phase to in-phase component is 0.73, which can be accurately measured. Actually, since the phase lock-in technology is well developed to have very sensitive and accurate phase control, the ratio of the out-of-phase to in-phase component can be measured at a value below 0.05, that corresponding to a flow rate below 12 m/s.

By separating the heater from the temperature sensor with a greater distance allows a more accurate measurement of the flow rate significantly higher than 10 m/s. Under this circumstance, the temperature sensor generates a much weaker signal for indicating the temperature variations due to the greater distance from the heater. Alternatively, a heater of smaller size is implemented to increase the frequency response. For example, by reducing the heater size from 4 μm to 2 μm, the frequency response would be increased by 4 times, and consequently 4 kHz can be used to modulate the temperature and velocity up to 40 m/s.

Multiple sensors can be built at different separations from the heater. Different delays will be measured at these sensors. One can obtained the average velocity from these measurements. Or one can use different sensors for different velocity ranges.

This direct velocity measurement technique can be combined with the prior-art DC temperature measurement technique to obtain additional information about flow. The temperature of the heaters and sensors is related to $C*V$, here C is the specific heat of the fluid, and V the velocity. The availability of a directly measurement of the velocity V enables a direct monitoring of the changes of the specific heat C as a function of density and the specific property of the molecules. By monitoring a change of the specific heat C, the changes to other parameters as a result of the change of the specific heat C can be determined. By implementing an additional pressure sensor in the flow, the contribution as a result of the change of the specific heat may be quantified that enables a flow measurement system to monitor flow rate changes arise from any change of the gas compositions. This direct velocity measurement technique can be applied at the initial calibration in the factory, or continuously during a flow sensor's normal operations, or calibration and trouble shooting in the field. This invention discloses methods that are advantageous for measuring the flow velocity independently. By combining together with the measurements applying the conventional thermal principle measurement techniques, both the flow rate and the composition of the flow can be obtained separately.

According to above descriptions, this invention discloses a micro electro mechanical system (MEMS) flow sensor having self-calibration capability. The self-calibrated flow sensor utilized a time-of-flight measurement process and provides a mass flow metrology for fluid. As discussed above, the MEMS self-calibrated flow sensor is implemented by applying a thermal convection measurement principle and is capable of measuring flow rate at an extended range. The flow sensor is supported on a silicon substrate and manufactured by applying the silicon MEMS process as integrated circuit support on the substrate. The MEMS self-calibrated flow sensor includes a pair of micro heaters that serve as the source for measurement of heat convection and a pair of sensors located next to the micro heater as shown in FIG. 1, that provide the measurement of the thermal conductivity at low fluid flow as well as the fluid velocity measurement signal receiver. The MEMS self-calibrated flow sensor further includes an independent temperature sensor 103 as shown in FIG. 1 to measure the fluid temperature. The MEMS self-calibrated flow sensor further includes a temperature sensor 104 shown in FIG. 1 integrated into the close control loop together with the micro heaters to provide constant power to the heater or maintain a constant temperature to the heater. The MEMS self-calibrated flow sensor is able to achieve the self-calibration via a modulation of the micro heater power and the modulated signal received by a downstream sensor. The modulation signal may be a sinusoid wave, a square wave, a pulse or any other modulation with a fixed frequency. The self-calibration is achieved by measuring the time of the modulated signal traveled between the micro heater and the downstream sensor located at a fixed distance away from the heater and the traveling time is applied in the time-of-flight scheme for determining the flow velocity. The method provides measurement and system configuration flexibilities and is applicable in measurement of the fluid mass flow rate in a flow channel of any size. For a channel size <80 mm, a single sensor may apply; for channel size ≧80 mm multiple sensors may apply to obtain average at different channel locations so that to ensure accuracy.

The self-calibrated MEMS mass flow sensor is formed on a conductive silicon substrate on top of a mask layer composed of silicon nitride or silicon oxynitride, preferably silicon nitride with a thickness of 0.2 to 1.0 micrometers and preferably 0.8 micrometers. The silicon substrate has a top surface covered by a thermal isolation bulk porous silicon or oxidized porous silicon, 30, with a thickness ranging from 5 to 200 μm, but preferably 100 μm. The micro-heaters 101A and 101B may be composed of gold or platinum and preferably platinum. The distance between the micro heaters may be from 50 to 5000 μm, but preferably 100 to 500 μm. The pair of temperature sensors, 102A and 102B located near to the micro heaters at both the up and drown stream around the micro heaters. The distance between the temperature sensor and the micro heater is from 2 to 12 μm, but preferably 5 μm. The self-calibrated MEMS mass flow sensor further includes a temperature sensor 103 located on the silicon substrate for measuring a fluid temperature. The self-calibrated MEMS mass flow sensor further includes a temperature sensor 104 located on the silicon substrate for measuring fluid temperature and forming a close loop to keep the micro heaters at a constant power or constant temperature, but preferably at constant temperature. The connection and output of the micro heater is made of gold or platinum, but preferably made of gold. The connection and output of the up and down stream temperature sensors made of gold or platinum, but preferably made of gold. The connection and output of the fluid temperature sensor made of gold or platinum, but preferably made of gold. The connection and output of the fluid temperature sensor for feedback loop with the micro heaters, made of gold or platinum, but preferably made of gold.

A method to carry out a self-calibration of a mass flow rate sensor is disclosed that includes a step of providing an electric pulse to a heater in the flow and determining a temperature of the heater. The method further includes a step of measuring a temperature variation by a temperature sensor disposed at a short distance from the heater. The method further includes a step of correlating the temperature variation measured at the temperature sensor with the temperature variation of the heater to determine a time delay and a corresponding flow velocity.

In an alternate embodiment, the present invention further discloses a method to carry out a self-calibration of a mass flow rate sensor is disclosed that includes a step of providing a sequence of modulated electric pulses with a specific frequency to a heater in the flow and determining a temperature of the heater. The method further includes a step of measuring a temperature variation by a temperature sensor disposed at a short distance from the heater. The method further includes a step of correlating the temperature variation measured at the temperature sensor with the temperature variation of the heater to determine a time delay and a corresponding flow velocity. In another exemplary embodiment, the sequence of modulated pulses is sine-shaped pulses. The temperature measured at the sensor by applying a lock-in amplifier technique. The ratio of the out-of-the phase and in-the-phase components is measured to obtain the phase lag. A flow velocity is determined from the phase lag. In another exemplary embodiment, the flow velocity is measured directly by measuring the temperatures of the heater and the temperature sensors. A pressure of the flow is also measured. The measurements are applied for monitoring the variation of a specific heat of the flow and also monitoring the density and also the composition of a gaseous flow.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A flow rate sensor disposed in a flow comprising:
a temperature sensor disposed adjacent to a micro-heater; and
a heater controller to provide a heating energy as a modulated sinusoid-waveform electric energy to said micro-heaters for measuring a heat convection and time delay of energy transfer from said micro-heater to said temperature sensor through said heat convection in said flow.

2. The flow rate sensor of claim 1 further comprising:
a processor for receiving an input of said flow velocity to directly determine a flow velocity of said flow.

3. The flow rate sensor of claim 1 wherein:
said heater controller provides said heating energy as a plurality of electric pulses each comprises said modulated sinusoid waveform electric energy an electric pulse to said micro heater.

4. The flow rate sensor of claim 1 wherein:
said heater controller provides said heating energy as said modulated sinusoid-waveform electric energy with a specific frequency to said micro heater.

5. The flow rate sensor of claim 1 further comprising:
a second temperature sensor disposed adjacent to a second micro-heater and said heater controller further provides heating energy to said second micro heater.

6. The flow rate sensor of claim 5 wherein:
said temperature sensor and heater and said second temperature sensor and heater are configured for measuring a upstream to downstream temperature difference substantially independent of a heat conduction in said flow.

7. The flow rate sensor of claim 1 further comprising:
a first independent temperature sensor to measure a temperature of said flow.

8. The flow rate sensor of claim 1 further comprising:
a second independent temperature sensor for integrating into
a control loop of said heater controller.

9. The flow rate sensor of claim 1 wherein:
said flow is conducting in a flow channel having a diameter less than 50 mm.

10. The flow rate sensor of claim 5 wherein:
said flow is conducting in a flow channel having a diameter $\geqq 50$ mm.

11. The flow rate sensor of claim 1 wherein:
said temperature sensor and said micro heater are supported on a semiconductor substrate.

12. The flow rate sensor of claim 1 wherein:
said micro heater comprising metal strip composed of gold or platinum.

13. The flow rate sensor of claim 1 wherein:
a distance between said temperature sensor and said micro heater is approximately 2 to 12 micrometers.

14. The flow rate sensor of claim 5 wherein:
a distance between said micro heater and said second micro heater is approximately 50 to 5000 micrometers.

15. The flow rate sensor of claim 1 wherein:
said temperature sensor comprising a metal strip composed of gold or platinum.

16. A method for measuring a flow rate of a flow comprising:
disposing a temperature sensor at a short distance from a micro heater in said flow and providing a heating energy to said heater for measuring a time lag by correlating temperature variations of said temperature sensor and said heater for determining a flow velocity of said flow; and
said step of providing a heating energy to said heater further comprising a step of providing a modulated sinusoid heating energy to said heater and determining a temperature response from a heater temperature variation by applying a lock-in phase amplification technique followed by measuring a ratio of an out-of-the-phase component to an in-phase component for determining a phase lag and determining a flow velocity from said phase lag.

17. The method of claim 16 further comprising a step of:
continuously determining said flow velocity for continuously monitoring a specific heat of said flow.

18. A method for measuring a flow rate of a flow comprising:
disposing a temperature sensor at a short distance from a micro heater in said flow and providing a heating energy to said heater for measuring a time lag by correlating temperature variations of said temperature sensor and said heater for determining a flow velocity of said flow;
continuously determining said flow velocity for continuously monitoring a specific heat of said flow; and
continuously measuring a pressure and applying said specific heat of said flow to continuously monitoring a density and composition of said flow.

* * * * *